(12) United States Patent
Thompson

(10) Patent No.: US 10,723,381 B2
(45) Date of Patent: Jul. 28, 2020

(54) TRIKE VEHICLE WITH SELECTIVITY PIVOTABLE OPERATOR CABIN

(71) Applicant: Andrew Thompson, Commack, NY (US)

(72) Inventor: Andrew Thompson, Commack, NY (US)

( * ) Notice: Subject to any disclaimer, the term of this patent is extended or adjusted under 35 U.S.C. 154(b) by 19 days.

(21) Appl. No.: 15/424,873

(22) Filed: Feb. 5, 2017

(65) Prior Publication Data

US 2018/0222526 A1    Aug. 9, 2018

(51) Int. Cl.
| | |
|---|---|
| *B62D 9/02* | (2006.01) |
| *B62D 23/00* | (2006.01) |
| *B62D 5/20* | (2006.01) |
| *B62D 27/04* | (2006.01) |
| *B60G 15/06* | (2006.01) |
| *B60R 16/08* | (2006.01) |
| *B60G 99/00* | (2010.01) |
| *B60G 3/14* | (2006.01) |
| *B62D 61/08* | (2006.01) |

(52) U.S. Cl.
CPC ............... *B62D 9/02* (2013.01); *B60G 3/14* (2013.01); *B60G 15/062* (2013.01); *B60G 15/065* (2013.01); *B60G 99/002* (2013.01); *B60R 16/08* (2013.01); *B62D 5/20* (2013.01); *B62D 23/005* (2013.01); *B62D 27/04* (2013.01); *B62D 61/08* (2013.01); *B60G 2200/132* (2013.01); *B60G 2200/44* (2013.01); *B60G 2300/122* (2013.01); *B60G 2300/45* (2013.01); *B60Y 2200/122* (2013.01)

(58) Field of Classification Search
CPC .......... B60G 2300/122; B60G 2300/45; B62D 61/08; B62D 9/02; B62K 5/10; B60Y 2200/122
See application file for complete search history.

(56) References Cited

U.S. PATENT DOCUMENTS

| | | | | |
|---|---|---|---|---|
| 7,600,596 | B2 * | 10/2009 | Van Den Brink | B62J 25/00 180/210 |
| 7,722,063 | B2 * | 5/2010 | Dieziger | B60G 3/20 280/124.103 |
| 8,249,775 | B2 * | 8/2012 | Van Den Brink | B62K 5/10 180/210 |
| 8,607,914 | B2 * | 12/2013 | Lee | B60G 3/00 180/210 |
| 9,428,236 | B2 * | 8/2016 | Goss | B60G 99/002 |
| 9,616,922 | B2 * | 4/2017 | Suzuki | B60G 3/145 |
| 2015/0021865 | A1 * | 1/2015 | Lin | B60G 21/005 280/5.513 |

(Continued)

FOREIGN PATENT DOCUMENTS

DE       102014215979 A1 *  2/2016  ............... B60G 9/02

*Primary Examiner* — Nicole T Verley

(57) ABSTRACT

The present invention is a hybrid crossover between an automobile and a motorcycle that is able to take tight corners almost like a motorcycle but is driven and handled like an automobile by optionally leaning into turns with one wheel in the front and two wheels in the rear of the vehicle and passenger compartment having an accelerator and brake pedals and steered with a steering wheel and gears that can be selected via a toggle switch gear selector located in the vicinity of the steering or by a floor and/or dash mounted unit.

13 Claims, 12 Drawing Sheets

(56) References Cited

U.S. PATENT DOCUMENTS

2015/0274160 A1* 10/2015 Lee ................... B62D 6/002
                                                        701/41
2018/0015954 A1*  1/2018 Casgrain ............ B62D 21/183
2019/0106174 A1*  4/2019 Brudeli ................ B62D 9/02

* cited by examiner

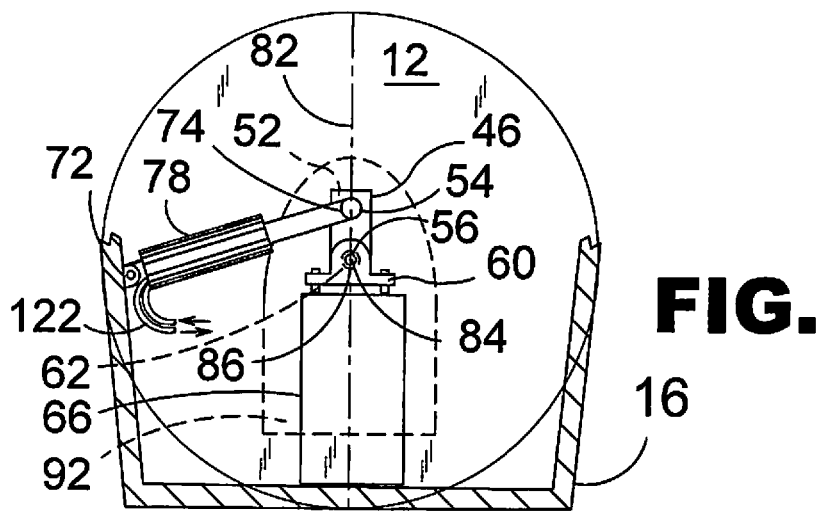
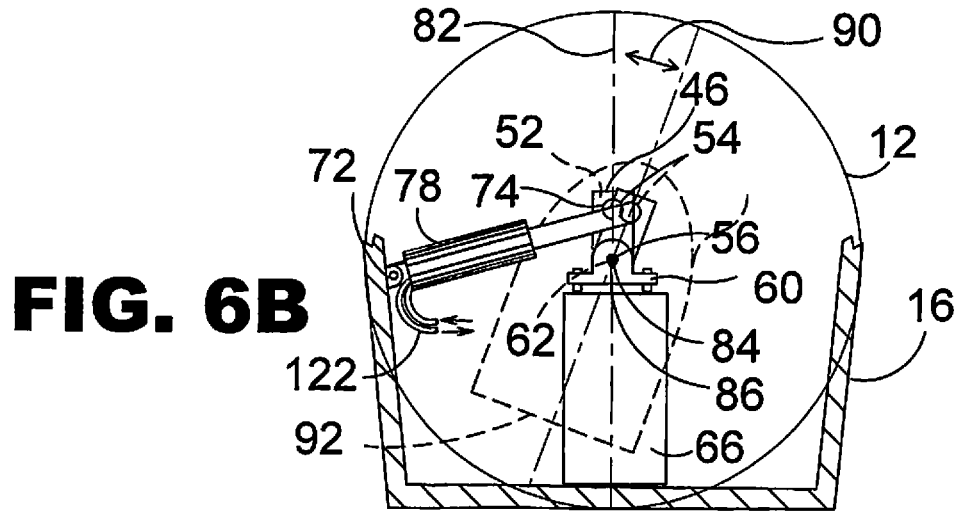
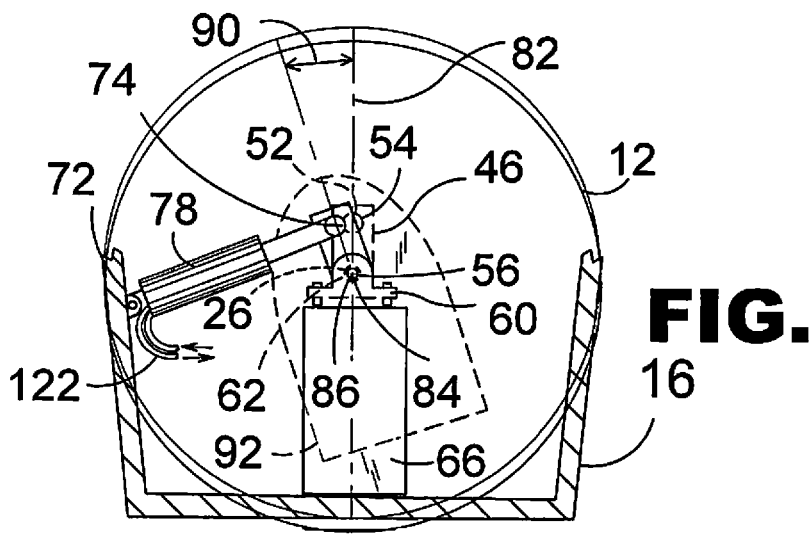

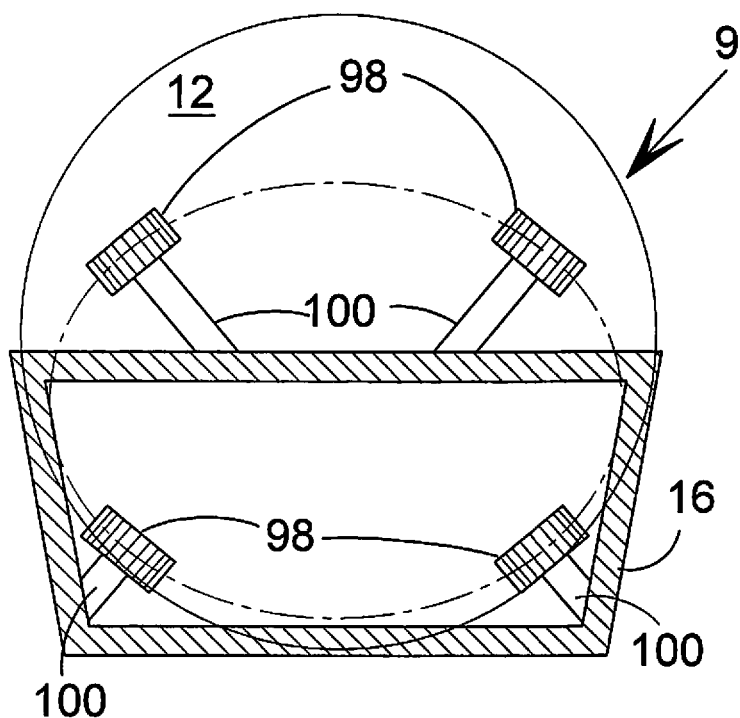 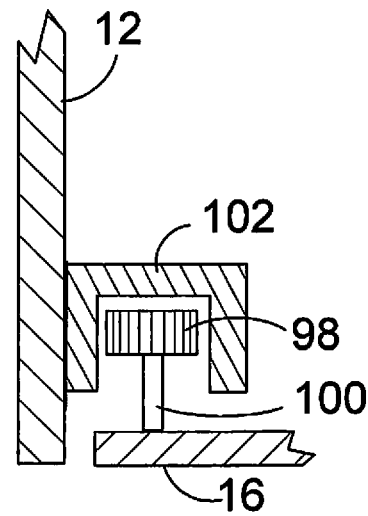
FIG. 8A  FIG. 8C
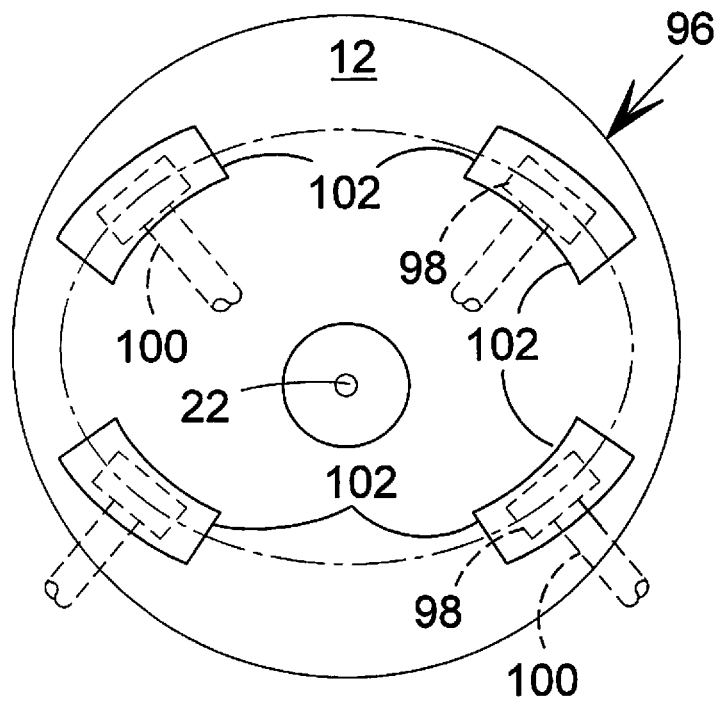 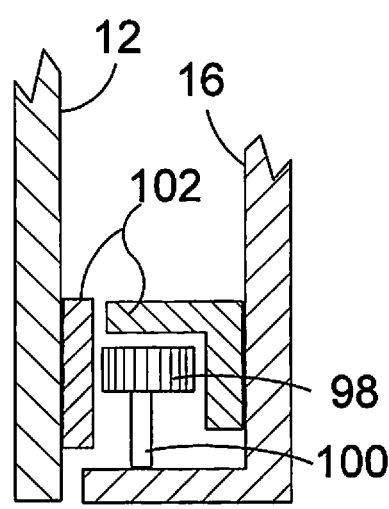
FIG. 8B  FIG. 8D

TRIKE VEHICLE WITH SELECTIVITY PIVOTABLE OPERATOR CABIN

BACKGROUND OF THE INVENTION

Field of the Invention

The present invention relates generally to motorized vehicles and, more specifically, to a three wheeled motorized vehicle providing a hybrid crossover between an automobile and a motorcycle that is able to take tight corners almost like a motorcycle but is driven and handled like an automobile by optionally leaning into turns with one wheel in the front and two wheels in the rear of the vehicle and passenger compartment having an accelerator and brake pedals. The vehicle is steered with a steering wheel and gears can be selected via a toggle switch gear selector located in the vicinity of the steering wheel or floor mounted or dashboard shifter allowing for automatic, manual, semi-manual, semi-automatic, manumatic, tiptronic style, and other forms of transmission.

Description of the Prior Art

There are other three wheel vehicles. While these vehicles may be suitable for the purposes for which they where designed, they would not be as suitable for the purposes of the present invention as heretofore described.

It is thus desirable to provide a hybrid crossover between an automobile and a motorcycle that is able to take tight corners almost like a motorcycle but is driven and handled like an automobile by optionally leaning into turns.

It is further desirable to provide a vehicle that is steered with a steering wheel and gears that can be selected via a toggle switch gear selector located in the vicinity of the steering wheel or floor mounted or dashboard shifter allowing for automatic, manual, semi-manual, semi-automatic, manumatic, tiptronic style, and other forms of transmission.

SUMMARY OF THE PRESENT INVENTION

The present invention provides a hybrid crossover between an automobile and a motorcycle that is able to take tight corners almost like a motorcycle by optionally leaning into turns but is driven and handled like an automobile.

The vehicle is designed with one wheel in the front and two wheels in the rear. A driver will be familiar with the vehicle's driving controls, since the vehicle has accelerator and brake pedals at the driver's feet or paddles mounted on the steering column. In an international market, the vehicle is very marketable since no modifications are necessary to make it a right or left handed drive vehicle.

The vehicle is steered by steering wheel (not a handle bar—like a motorcycle or bike), and gears selected via a toggle switch gear selector located in the vicinity of the steering wheel allowing for automatic, manual, semi-manual, semi-automatic, manumatic, tiptronic style, and other forms of transmission controls. Enabling the driver to change gears with their fingers without fully taking their hands off the steering wheel. Gear selection can also be a traditional floor mounted shifter as well.

Cockpit

The vehicle is a two-seater sports, sportster, touring or economy commuter with a tandem seating arrangement (driver in front of the passenger), so the driver will have a complete undisturbed view of the road in front of, and to the left and right of the driver. This arrangement also allows the driver to get a full vision of the dashboard like a formula one race car or a jet pilot. Also, special accommodations can be easily made for a handicapped driver for a hand operated gas accelerator and brakes. This also works well if the driver has broken or sprained his/her driving leg, or if the driver is elderly with reduced leg strength.

Tilting/Banking

The vehicle will tilt the riders within the vehicle when making corners or changing lanes, giving that swinging sensation a biker rider feels when tilting his/her motorcycle or that free floating sensation felt by pilots when their aircraft bank to the left or to the right. This tilting action allows the vehicle to shift its center of gravity more into corners like a motorcycle allowing tighter turns and better handling on corners than a car. The tilting mechanism is operated automatically allowing the driver to concentrate only on driving the vehicle (not trying to drive and make additional effort to make the vehicle tilt). All the driver has to do is turn the steering wheel and the onboard systems (hydraulic, mechanical, or otherwise) and/or electronics will do the rest. However, only the front section of the vehicle that holds the seating compartment will tilt. The rear section that holds the vehicle power plant, trunk and rear wheels does not tilt but stands upright on the road at all times like a car.

This tilting feature can be controlled by the driver. By giving the driver the ability to activate the tilt, or turn the tilt off giving the vehicle the ability to operate in a static non-tilt mode. This dual mode makes the vehicle unique in the fact that you have two vehicles in one. When the tilt mode is on it acts like a tilting trike. When the vehicles tilt mode is off it give the vehicle the ability to act like a static/non-tilting trike.

Powerplant

The Powerplants and Powertrain for the vehicle can come from various platforms if needed. The chassis design and accessibility allows for versatility in the vehicle powerplant and powertrain.

Engine types can include, but is not limited to the following: Gasoline powered piston internal combustion engines, diesel engines, rotary engines, turbine engines, steam engine, hybrid engines, electric motor systems, fuel cell, hydrogen engine, air powered engines, or any future powerplants.

Fuel usage can be wide any varied such as: Gasoline, Ethanol/Alcohols, Diesel, Bio diesel, Biogas, Hydrogen, Propane, Steam, Air, Electricity, Solar, Hydro, Fuel Cell, Battery, or any other type of future fuels.

While keeping a low vehicle weight, reducing vehicle air drag, reducing rolling resistance the vehicle can have a fuel economy of over 30, 40, 50+ miles per gallon (MPG). Through the assistance of a small engine the vehicle can have high mileage of an economy car and the high performance of a sports car. This allows the vehicle to get the best of both worlds without any compromise. This is not generally strived for in the modern car industry, since they would rather have you purchase an economy car and a sports car separately than giving you both.

Chassis

The whole seating and engine compartments will be made from a steel roll cage similar in design to a roll cage in a track racecar. A track racecar can crash at high speeds without the use of airbags and the driver has a higher chance of walking away from the accident without any injuries that a street car with airbags and crumple zones. Since the racecar roll cage is superior in design its concept will be borrowed and bring race track safety to the streets. This will help protect the riders in the event of an accident.

For all those automobile drivers out there who admired motorcycles but were afraid to own one because of the danger factor in the event of an accident, this will be the vehicle for them. Like an automobile the rollcage around the riders will absorb the impact of the collision, while a motorcycle rider will never have that luxury. This is not a bad trade off when you think about it. You don't have to worry about getting wet in the rain, frost bitten in the snow or suffering from heat on a hot summer day. This vehicle with its enclosed cabin can filter out any outdoor stale air when the door and windows are closed. An air condition, air filtration or purifier system will be used to keep fresh filtered air inside the seating compartment at any desired temperature.

Systems and Processes
Tilting System

The vehicle will tilt or bank the riders within the vehicle when making corners or changing lanes, giving that swinging sensation a biker rider feels when tilting his/her motorcycle or that free floating sensation felt by pilots when their aircraft bank to the left or to the right. This tilting action allows the vehicle to shift its center of gravity more into corners like a motorcycle allowing tighter turns and better handling on corners than a car. The tilting mechanism is operated automatically allowing the driver to concentrate only on driving the vehicle (not trying to drive and make additional effort to make the vehicle tilt). All the driver has to do is turn the steering wheel and the onboard systems and/or electronics will do the rest. However, only the front section of the vehicle that holds the seating compartment will tilt or bank. The rear section that holds the vehicle powerplant, trunk and rear wheels does not tilt but stands upright perpendicular on the road at all times like a car. The front cabin section of the chassis tilt/bank left or right up to a minimum or maximum degree angle, while the rear chassis section stays static to the road not moving.

This tilting feature can be controlled by the driver. By giving the driver the ability to activate the tilt, or deactivate the tilt, gives the vehicle the ability to operate in a static non-tilt mode. This dual mode makes the vehicle unique in the fact that you have two vehicles in one—a tilting/banking vehicle and a static vehicle.

When the tilt mode is on it acts like a tilting trike. When the vehicles tilt mode is off it gives the vehicle the ability to act like a static/non-tilting trike. The tilting is achieved by a two piece chassis, with the aid of a central pivot point bearing hub. This central pivot point bearing hub connects the two separate chassis (front seating compartment chassis & rear powerplant chassis) together to make one unit. Along with the central pivot bearing hub there will be a pivoting arm that connects between the front tilting chassis and the rear non tilting chassis to initiate the tilting process. This can be a single arm or a multiple pivot arms arrangement. It may also be any other attached or unattached, mechanical, electrical, hydraulic, computer controlled, electronic, remote, wireless, cloud based, or connected motorized or non-motorized device or mechanism to initiate the tilt process. On the pivoting arms) will be mounted for redundancy a manual (or powered) self centering coilover assembly (dampener & spring) to assist with self leveling the tilting cabin back to an upright vertical 12 o'clock position after a powered tilt is initiated. There will be four or more or less assisted roller tracks to help guide the two piece chassis tilting system. Also there will be a dual powered and/or manual operated frame locking mechanism to stop the trike from tilting, when the tilting mode is turned off or when the trike is in park mode.

There will be a single, dual, or multiple hydraulic ram(s) connected to the rear tilting pivoting arm to tilt the seating compartment to the left or the right. Again this can be hydraulic, mechanical, electrical, electronic, or computerized control device or mechanism, powered or non-powered, wired or wireless. A second set of single, dual, or multiple hydraulic ram(s) will be connected to the front fork or steering control, arm, rod, or shaft to give power assisted steering to the single front motorcycle tire. Both the front power steering hydraulic ram(s) and rear tilting hydraulic ram(s) are tied into the same tilting system (but can be separated with separate controls—powered or non-powered) and supplied by single, dual, or multiple power steering pump(s) or hydraulic pressure pump(s) mounted on the vehicle's engine/powerplant.

The whole tilting mechanism is controlled by a steering column mounted hydraulic steering servo in conjunction with hydraulic valves, controllers and/or g-sensors & additional sensors as needed. The vehicles ECU (electronic control unit that controls one or more electrical system or subsystem in vehicle) can or will also assist with input and controls for the tilting/banking system as well. The driver simply turns the steering wheel left or right and the tilting system will do the rest. A speed controller can be used to disable the tilting system from activating below a designated speed. Also for tilting self testing an override hydraulic controller valve or other mechanical, electronic, or computerized process or mechanism wired or wireless, remote or cloud based, can be used to tilt the trike left and/or right without manipulating the steering wheel.

Suspension and Braking System

The suspension system is done in two parts—the front motorcycle type suspension and the rear automobile type suspension. A single motorcycle tire is used; a custom fork is designed to hold the tire and is connected to a springer front end suspension. Using a dual (or multiple) automobile coilover spring(s) and dampener assembly to deal with the additional weight that is more than what a typical motorcycle suspension can handle. A motorcycle has a lot of load bearing on the single front tire during braking the additional, stronger car coilover assembly (dampener and springs) will add to better handling on the trike. Also a car disc brake system will be used on the front tire. With a conventional car disc brake rotor and car brake caliper with single or multiple pistons to give better braking on this trike. This front car braking system is used versus a front bike braking system, since the front bike brakes will not be able to handle above certain load capacity of the trike along with payload.

In the rear of the trike we will use car suspension and car disc braking system. There will be a rear left and right side dual upper and lower a-arm suspension for an independent suspension system. Between the upper and lower a-arms there will be a mounted custom assembly to hold the rear wheel axle assembly, car disc brake rotor and car brake caliper with single or multiple or more brake pistons. On the rear left and right side upper A-arms will be mounted a car coilover assembly (dampeners and springs) and the other end of the car coilover assembly will be mounted to the rear frame. In between the two frame mounts of the car coilover assembly will be mounted an anti-sway bar to maintain frame rigidity and reduce rear chassis frame twisting while trike is making turns, going into a corner or tilting. All of the cornering g-force is not just concentrated to the side of the rear tire in the trike cornering state.

Each of the trike's three wheel axles can accommodate speed sensor rings that will give the trike the ability to add safety upgrades such as ABS (anti-lock brake system), traction control, and electronic stability control. In a basic state the trike does not need the speed sensor rings and will rely on balanced three wheel disc braking system. The brake pedal assembly can be adjusted to get brake bias to either the front or the rear wheels. This gives the trike a basic mechanical three wheel braking system without any worries of any electrical brake controller failures and also making brake maintenance, troubleshooting and repairs simpler and more cost effective towards the consumer.

Lighting System

The outside and inside of the trike will have majority of the vehicle's lighting consisting of LED lights. This will be used to help with brighter illumination, lower power consumption needed for the lighting, longer lifespan on the LED light bulbs compared to the incandescent light bulbs. From the exterior LEDs can be used in the following: front indicator lights, rear indicator lights, corner marker lights, daytime running lights, park lights, fog lights, brake lights, driving lights, reverse lights, door handle illumination lights, tilting lights, next lane illumination lights & dual headlamps. The trike will have dual automobile high/low beam headlamps instead of using motorcycle headlamps to increase night time illumination.

The next lighting feature will be next lane illumination lights that will low mounted in the front section of the trike. These lights are only activated when the trike is in non-tilt mode or on a static non tilting trike. When the driver turns on his indicator lights and/or turn his steering wheel left or right, the next lane illumination lights will get activated and illuminate the next lane over in the direction where the indicator light is activated or in the direction where the steering wheel is turned. The Next Lane Illumination lights will only engage when the main front headlamps are on in night time or low light activation. This safety feature will give the driver full illumination into the lane he or she is planning on going into, or illuminating a corner when the trike is cornering.

The angled tilting assist headlamps are static lights mounted in the front section of the trike and will only be activated when the trike's Tilt Mode is activated. Whenever the trike's front cabin starts to tilt to the left or the right, the angled tilt headlamps into the tilt side of the vehicle will get activated to maintain the same road width forward illumination in front of the trike & also illuminating the corner the trike is leaning into. There will be more than one tilt light(s) mounted on each side of the trike, each individual tilt light will get triggered depending on the trike's tilt angle since each tilt light will cover a certain tilt angle range. Once this range is exceeded the next tilt angle light gets activated to cover the trike's wider tilting angle. The reverse is the same, as trike's the tilt angle is reduced, so will the individual angle tilt lights will get turned off as needed. This lighting system can be activated by an automatic controller or an angle sensor mounted in the frame of the tilting trike.

Finally the trike can accommodate a wheel well illuminator in all 3 wheel wells of the trike. This feature can be activated in the event the outside lighting is low or it's night time and the driver needs to inspect or inflate his or her tires but don't need to hassle and hold a flashlight during the process. This can now me a one man job instead of a two man job with a second person holding a flashlight to illuminate the tire area for the driver while inspecting or inflating the tires in low light or night time scenarios. It can be activated by the driver from the cabin area or even by remote from outside the seating compartment.

Airtank Inflation System

The airtank inflation system will consist of an airtank, airpump, controller with a regulator. This will have multiple uses within the vehicle. The first application is a built-in tire inflation system that will have 3 plumbed air supply lines traveling from the airtank to the wheel well of the 3 mounted tires. The three air supply lines will terminate at an air outlet connector in the close vicinity of each tire on the vehicle. With the use of a stored portable air chuck in the vehicle the driver can plug in the portable air chuck in the air outlet connector in the wheel well that will now give the driver the ability to inflate the tire in that vicinity. They can then take the portable air chuck to the other two wheel-wells and repeat the procedure. This will save the driver time to drive to locate an air pump on the road to inflate his or her tires. Or have the hassle to unpack and plug in a portable pump to inflate tires and try to stretch the pump around the whole vehicle to get to each tire. Tire inflation system will be used in conjunction with remote tire pressure monitoring system mounted on each tire. The second usage for the airtank inflation system is to integrate with a vehicle air ride suspension system. This can be used to regulate the suspension dampening rate, adjusting vehicle ride height and even suspension ride height auto leveling. This inflation system can be applied to any future technologies that require pressurized air to do whatever needed vehicle application.

Camera/Blindspot System

To assist the driver with vehicle visibility, many blind spots will be covered with the aid of cameras and viewed by multiple screens on the dashboard for the driver or possibly from the rear seat by the passenger. There will be a forward nose mounted parking camera, front and rear bumpers, left and right corner cameras, left and right side mirror mounted blind spot cameras, rearview camera and reverse camera. This will give the driver a complete 360 degree visibility around the vehicle as needed. Also any additional camera can be added as needed to expand on the vehicle visibility. To provide assistance with the forward parking camera and reverse cameras an acoustic sensor system will be used 360 degree/all around view cameras can or will be added to the trike for visual and safety needs.

To elaborate on the system, the whole blind spot camera system will be monitored from the cabin seating compartment by the driver from screens. There will be a top mounted central dashboard screen for nose and any future forward cameras. A left hand side dashboard mounted screen for any left hand side vehicle mounted cameras. A right hand side dashboard mounted screen for any right hand side vehicle mounted cameras. Finally the central top mounted rearview mirror screen to monitor the rearview & reverse vehicle mounted cameras.

The front forward nose mounted parking camera will assist the driver in parking the trike nose first into a parking spot. Since the trike has no front bumper and just an exposed front tire, we provided the nose camera to avoid the driver damaging the front tire against any sharp curbs or debris. In conjunction with the nose camera a front mounted acoustic parking sensor will be installed and both the acoustic parking sensor and nose camera will be monitored by the driver from a central top mounted dashboard screen.

Various passive or active safety systems—such as brake assist, traction control systems, intelligent speed adaptation, electronic stability control systems, pedestrian detection, collision warning system, lane change/departure, lane tracking, traffic signal and sign recognition, auto-pilot, or auto-drive and other (ADAS) advanced driver assistance systems as well as the various visual, camera, 360 degree camera, audio, sonar, laser, infra-red, thermal, night vision, lidar type sensors and/or system will or can be applied to the trike.

There will be 2 front left & right nose mounted corner cameras & 2 rear left & right bumper mounted cameras. These 4 cameras will allow the driver while reversing to only push out a few inches of the rear of the vehicle and see around the corner to the left & right of the trike to see if there is any oncoming traffic, instead of reversing most of the body of the trike to allow the driver to see the oncoming traffic directly thru the windows. The same applies while driving forward, the driver only need to advance the trike nose a few inches or less than 3 ft to see around the corner for oncoming traffic to the left or right of the trike. This is a much safer option to drive out the vehicle into oncoming traffic behind a blind spot while monitoring the left and right corner videos from the dashboard mounted left and right hand side screens. The rear left and right cameras can be activated automatically when the trike is placed in reverse gear. Or it can be triggered manually by the driver. Likewise the front left & right corner cameras are triggered manually by the driver. These 2 left and right hand side dashboard mounted screens can be used for side mirror mounted blind spot cameras that can get activated automatically when the indicator light is activated or manually by the driver.

Finally we have the central top mounted rearview mirror screen to monitor that defaults to the rearview camera when the trike is powered on since the trike has no rearview window. This will allow the driver to view the road behind him as if looking out of a rearview mirror, minus any rear seat obstruction to the rearview window in a normal vehicle. However when the trike is put in reverse gear the reverse camera gets activated automatically and is now viewed on the central top mounted rearview mirror screen. The driver will also have the ability to manually toggle between the rearview and reverse cameras to the central top mounted rearview mirror screen.

In conjunction with the reverse camera a rear mounted acoustic parking sensor will be installed to assist with early warnings for any rear collisions.

All Access (Handicap Mode)

Another unique feature of this trike is to make it all access (handicap driver ready) from the factory instead of adding handicap driving aids as an optional upgrade after the trike is manufactured or installed as a aftermarket upgrade via third party installers. This benefits many motorcycle enthusiasts worldwide who may be handicapped or too old to ride. Since the trike is classified as a motorcycle a handicapped driver can get to participate as the main driver/rider instead of a spectator/passenger. By rethinking the concept and deciding to integrate the handicap driving aids into the vehicle—it becomes mostly or fully undetectable by the spectators, unless you know it was installed in the vehicle. Besides being a global vehicle and ergonomic vehicle, we are also an "All Access" vehicle.

The five components of the All Access concept are the following: Door Access, Steering Wheel, Gear Selector, Brakes and Accelerator. The third, fourth and fifth items on the list below are all controlled by a four way paddle shifter mounted behind the steering wheel.

(1) Door access—the trike will have a door that opens upwards that will give the handicapped wheel chair driver easy access to roll up as close as possible to the driver's chair. From that point the driver can transfer him or herself from the wheelchair to the vehicle's driver seat.

(2) Steering wheel—Because the steering wheel will never make more than one complete turn to lock the steering wheel it is a lot easier for the driver to steer the trike.

(3) Gear selector—The upper left & right paddle shifters will be used to select gears whether the vehicle has an automatic or semi-automatic transmission.

(4) Brakes—The lower left & right paddle shifters will be used to control the brake.

(5) Accelerator (gas pedal)—The lower left & right paddle shifters will be used to control the accelerator.

These lower paddles shifters can be connected out of the sight of the driver to the accelerator cable and the brake cable or pedal. This can be achieved via a mechanical link or a power assisted link from the lower paddle shifters. So there will be no cabin visible connectors on the floor gas & brake pedals. The vehicle will have a normal interior with no indication it has handicap capability. When the handicap mode is not active the gas & brake paddle shifters can be disabled temporarily to avoid the driver accidentally accelerating or braking via the paddle shifters.

Another plus to the All Access hand controls is for the elderly drivers & a driver with a sprained or broken driving leg. In regards to the elderly drivers, some have weak legs as they get older & have problems pressing the brake & gas pedals with enough force. This is where the hand controls come into play. Likewise if a normal driver sprains their driving leg or breaks their driving leg, this trike will still allow them to drive themselves without any or very minimal vehicle modifications via the hand controls.

A primary object of the present invention is to provide a three-wheeled vehicle having a pair of rotatively joined chassis's with operator control for disengaging and engaging front chassis tilt mode.

Another object of the present invention is to provide a three-wheeled vehicle having a rear chassis portion having a frame incorporating a coupling member and wheels.

Yet another object of the present invention is to provide a three-wheeled vehicle having a front chassis portion having a frame incorporating a coupling member and a steerable front wheel.

Still yet another object of the present invention is to provide a rear chassis portion and the front chassis portion when conjoined by the latchable front and rear coupling members enables the front chassis portion to tilt relative to the rear chassis portion by virtue of the conjoined couplings and the front wheel.

An additional object of the present invention is to provide a force control height management system comprising a shock unit, a control bar and a torsion bar thereby controlling ride height and road feel.

A further object of the present invention is to provide a steerable wheel in fluid communication with a plurality of rams driving a pivot arm in a controlled left or right tilt dependant on angular rotation of the steering wheel.

A yet further object of the present invention is to provide hydraulic steering column with servos and at least one hydraulic steering pump at the engine.

A still yet further object of the present invention is to provide the hydraulic tilt system controlled by pressure supply by steering system turning.

Another object of the present invention is to provide ECU, Actuators, Sensors, Pulse width units.

Yet another object of the present invention is to provide a top portion roll cage member and a bottom roll cage portion that are hingedly attached.

Still yet another object of the present invention is to provide tracks and rollers releasably fixed to a respective front and rear chassis portion forming guideways for constraining tilt movement to a predetermined angular range.

An additional object of the present invention is to provide the three wheeled wherein angular tilting is preferably about a 45°±15° axis of a sun mounted unit of the drive spindle of the front chassis.

Another object of the present invention is to provide a center sun unit housing a spindle and a directional center assembly unit securing unit.

Yet another object of the present invention is to provide springs and dampeners holding the front chassis in an at rest steady state coplanar with the rear chassis with the springs and dampeners returning the front chassis to a rear chassis coplanar steady state after directional tilting.

Still yet another object of the present invention is to provide the pair of frames matable locking members that can be selectively actuated to disable the vehicle front chassis from tilting.

An additional object of the present invention is to provide the vehicle having a locked at rest state under predetermined vehicle conditions including, vehicle off, parked or low speed.

A further object of the present invention is to provide the three wheeled vehicle further providing another pair of locking members that are manually engage by applying a force to either chassis thereby actuating the additional pair of locking members.

A yet further object of the present invention is to impinge tilt upon the trike's front chassis having operator cabin in similar fashion as a motorcycle, where the motorcycle and operator tilt into a turn.

A still yet further object is to provide a front chassis/passenger cabin with at least one seat with ignition control, steering control, brake control, accelerator control, compartment climate control, etc.

Another object of the present invention is to provide a vehicle that acts much like a motorcycle with the chassis's rotatively attached with the rear chassis having a pair of spaced apart wheels with an axle forming anchor for a rear chassis tilt arm having at least one power unit providing a predetermined force to the front chassis tilt arm.

Yet another object of the present invention is to provide a vehicle a joined front and rear chassis portions with the operator provided with control for selectively engaging and disengaging a selectively chassis rigid or tiltable mode.

Additional objects of the present invention will appear as the description proceeds.

The present invention overcomes the shortcomings of the prior art by providing a three wheeled motorized vehicle as a hybrid crossover between an automobile and a motorcycle that is able to take tight corners almost like a motorcycle but is driven and handled like an automobile by optionally leaning into turns with one wheel in the front and two wheels in the rear of the vehicle and a tilting passenger compartment having an accelerator pedal, brake pedal, steering wheel and gears that can be selected through a toggle switch gear selector located in the vicinity of the steering wheel further providing for automatic, manual, semi-manual, semi-automatic, manumatic, tiptronic style, and other forms of transmission control. Traditional floor mounted and/or dash mounted transmission controls can be used as well.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is an illustrative view of the three wheeled vehicle of the present invention.

FIG. 2 shown are embodiment of roll cages incorporated as passenger cabin integrity members.

FIG. 3, shown is an illustrated side view of the joined chassis's and passenger cabin tilt control device.

FIG. 6A is an illustrative view of a single force member used to tilt the cabin in an at rest state.

FIG. 6B is an illustrative view of a single force member tilting the cabin to the right.

FIG. 6C is an illustrative view of a single force member tilting the cabin to the left.

FIG. 8A is an illustrative view of the rollers used to control and limit the tilting of the front chassis.

FIG. 8B is an illustrative view of the rollers constrained by tracks used to limit tilting of the front chassis.

FIG. 8C is an illustrative view of a track configuration guiding and constraining the rollers while tilting the front chassis.

FIG. 8D is an illustrative view of a track configuration guiding and constraining the rollers while tilting the front chassis.

DESCRIPTION OF THE REFERENCED NUMERALS

Figure 1:
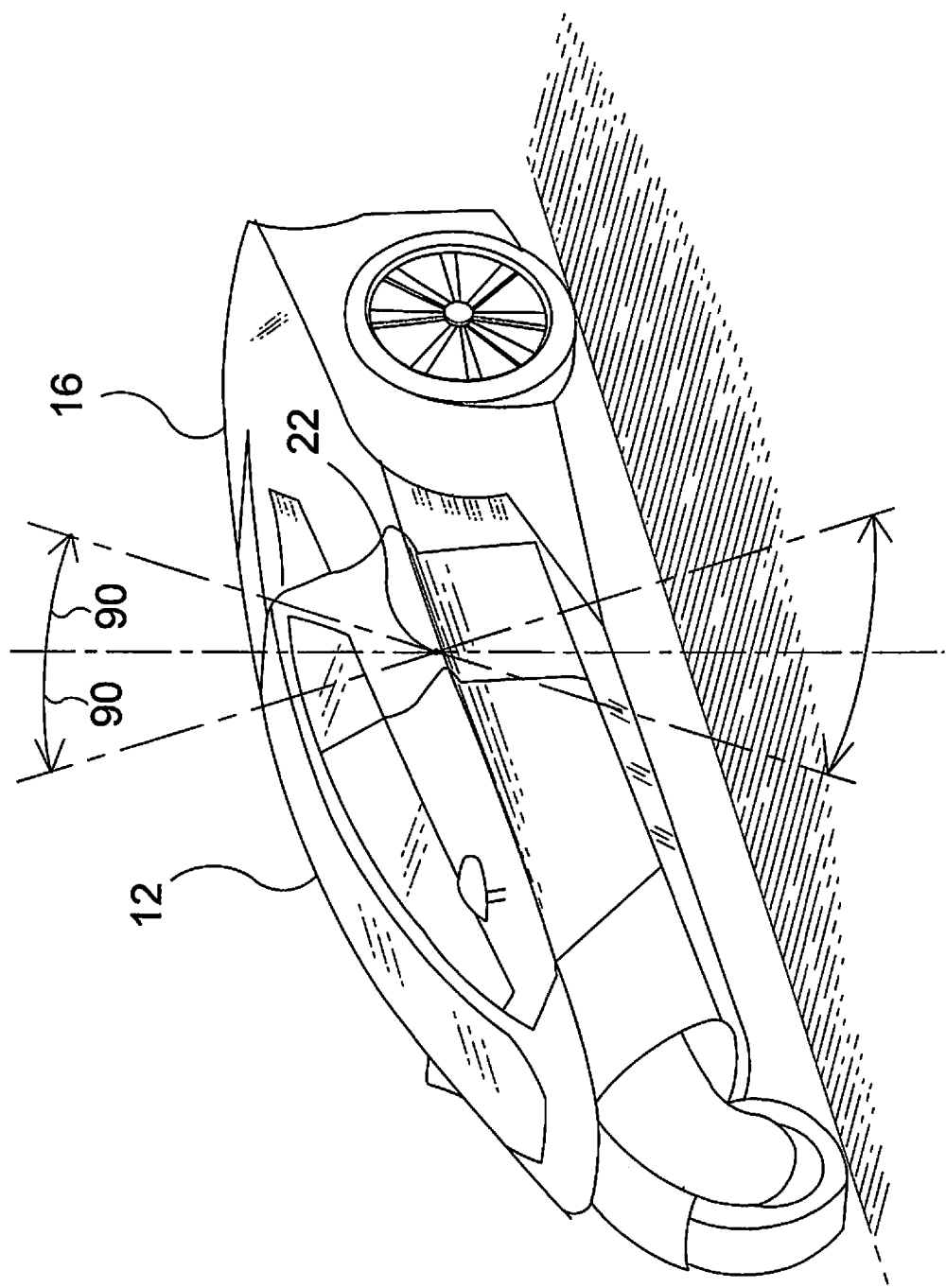

Turning now descriptively to the drawings, in which similar reference characters denote similar elements throughout the several views, the Figures illustrate the three wheeled vehicle of the present invention. With regard to the reference numerals used, the following numbering is used throughout the various drawing figures.

10 three wheel vehicle
12 front chassis/passenger cabin
14 rear chassis coupling of 12
16 rear chassis
20 front chassis coupling of 16
22 central pivot point bearing hub
24 mounting plate of 22
26 bearing of 22
28 spindle of 22
30 fastener of 28
34 rear chassis hub bearing
38 rear chassis/passenger cabin stationary/tilting apparatus
40 pivot arm
42 stationary force member
44 dynamic force member
46 pivot arm post
50 pivot end of 46
52 passenger-cabin-tilt drive-arm
54 ram fastener arm of 52
56 pivot arm axle of 46
60 pivot arm pivot mount of 56
62 pivot arm axle bearing of 60
64 pivot arm axle bore of 60
66 pivot arm pivot mount support
70 pivot arm coilover fastener
72 rear chassis anchor
74 pivot arm ram anchor
76 coilover
78 ram
82 center line of passenger cabin rotation/tilting
84 center point of passenger cabin rotation
86 co-aligned center lines of hub bearing and pivot arm axle
88 center point of pivot arm drive arm
90 arc of 82
92 seat
96 front/rear chassis tilt guides
98 roller of 96
100 support of 98
102 track of 96
104 steering wheel
106 steering column
108 vehicle control console
110 steering column mount of 108
112 gear shift up paddle
114 gear shift down paddle
116 brake actuator paddle
118 accelerate actuator paddle
122 hydraulic lines
124 power steering ram
126 power steering servo
128 tilt ram servo
130 hydraulic fluid tank
132 power steering pump
134 torsion bar
138 ride bar
140 control arm
142 cluster
144 fuse
146 actuator
150 chassis lock/no-tilt lock
152 manual lock
154 lock receptacle
156 roll cage of 12

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrated embodiment of the three wheeled vehicle of the present invention. The trike 10 constructs a chassis from a front chassis portion 12 and a rear chassis portion 16 rotatively joined through a central pivot point bearing hub 22 with the rear chassis housing most of the vehicle components, such as battery, engine, etc. supported by wheels and axle with the front chassis elongated forming passenger cabin supported by bearing hub 22 and the one forward wheel allowing the front chassis/passenger cabin to tilt left and right through arc 90 relative to the non-tilting rear chassis portion 16.

Figure 2:
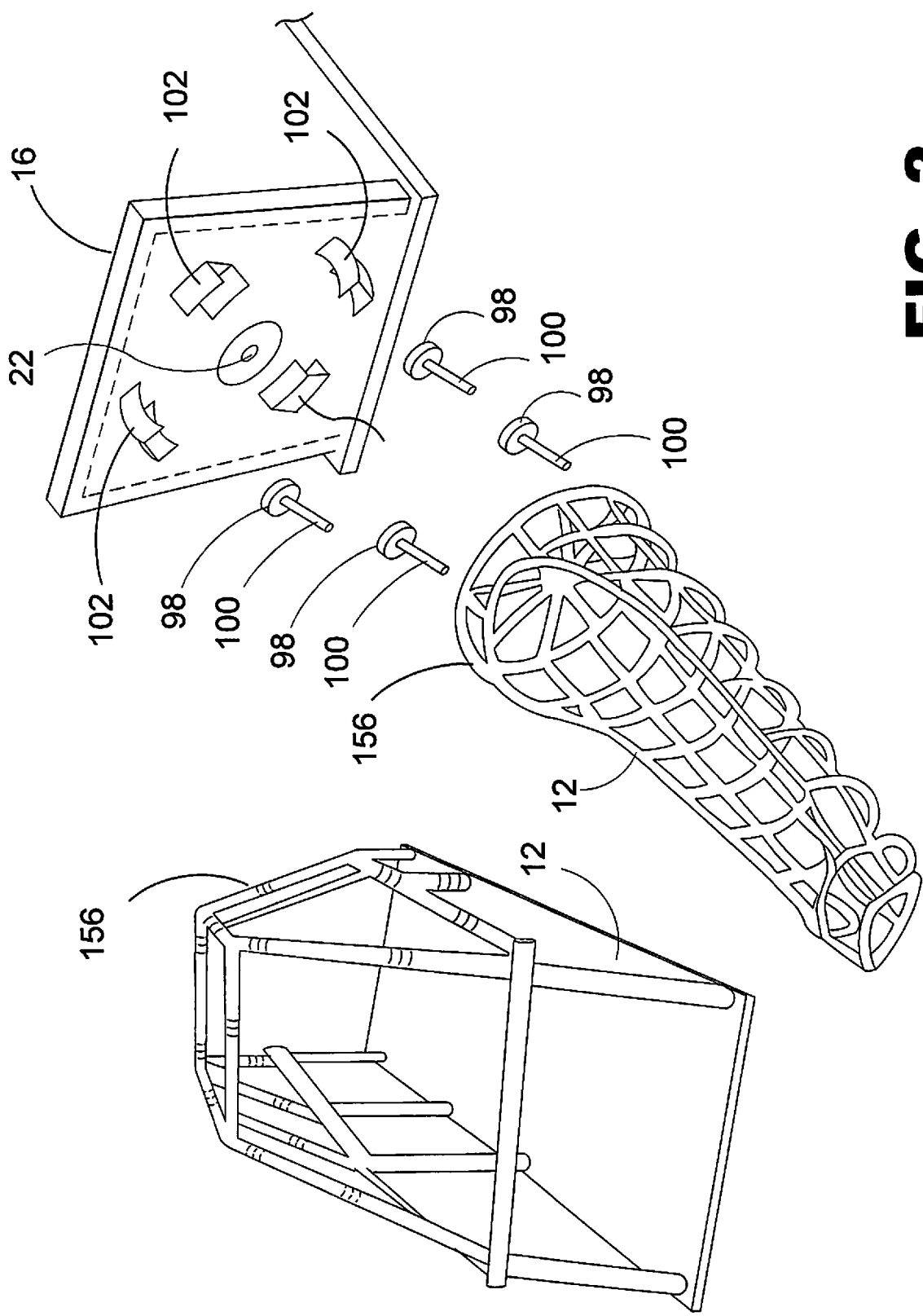

Referring to FIG. 2 shown are embodiment of roll cages incorporated as passenger cabin integrity members. Roll cage 156 is a safety feature incorporated to protect the occupants of the passenger cabin 12 and has proven its worth repeatedly in racing. Rollers 98 and supports 100 are exploded from the tiltable roll cage with tracks 102 releasably attached to rear chassis 16 structure. An alternate arrangement is illustrated in FIG. 8A-8D. Alternately, is Also shown is the rear chassis central point pivot bearing hub 22.

Figure 3:
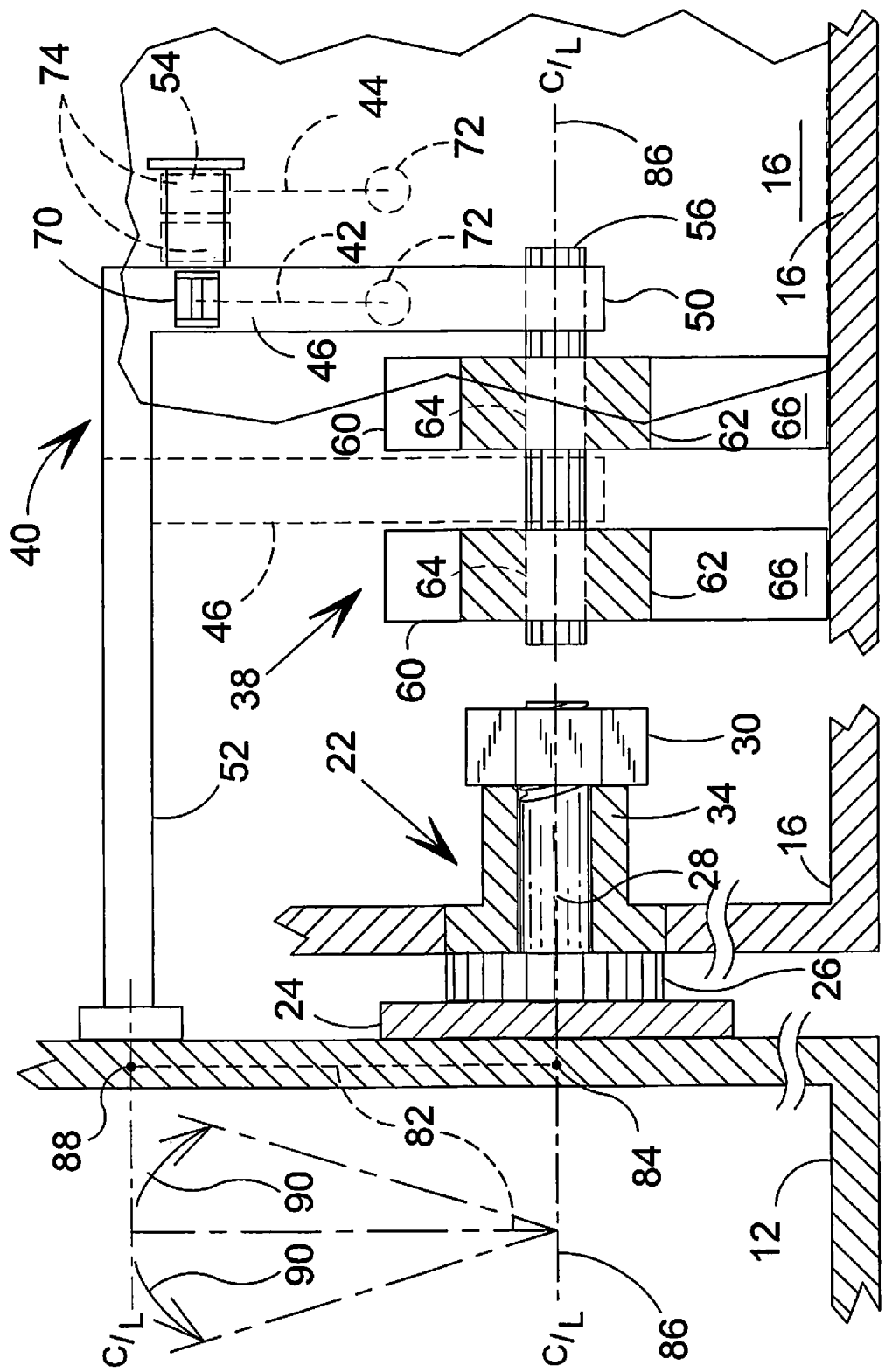

Referring to FIG. 3, shown is an illustrated side view of the joined chassis's and passenger cabin tilt control device. The front and rear chassis's 12, 16 are rotatively fastened one to the other through the central pivot point bearing hub 22 comprising mounting plate 24, bearing 26, spindle 28, rear chassis hub bearing 34 and fastener 30. Rear chassis 16 having wheels mounted on a rear axle (not shown) isn't rotative and therefore serves as stable platform for the majority of vehicle components, such as engine, battery, etc. with the design intent of having the front chassis 12 serving primarily as operator and passenger cabin 12 that by virtue of its single wheel and rotative rear chassis coupling 22, is able to tilt left and right. The rear chassis also serves as platform for operator driven rear chassis/passenger cabin stationary/tilting apparatus 38 comprising pivot arm 40 rotatively mounted by axle 56 in bore 64 having bearing 62 of pivot mount 60 fastened to rear chassis 16 through support mount 66. Pivot arm 40 is comprised of a leg portion 46 extending from distal end 50 to arcuately driven tilt arm 52 fixedly attached to cabin 12 whereby the operator selectively tilts the passenger cabin/front chassis left and right by turning the steering wheel. Maintaining cabin 12 in a stationary operative state defined as the front chassis 12 in a substantially horizontal plane relative to a substantially horizontal plane of the rear chassis 16 is one or more stationary force members 42 extending between pivot arm fastener 70 and rear chassis anchor 72. One or more dynamic force members 44 apply a force between an anchor 72 and pivot arm fastener arm 54 fastener 74 driving arm 40 left or right tilting cabin 12 with stationary force members 42 ensuring return of cabin 12 to a stationary operative state.

Also illustrated is the co-linear alignment of center lines 86 for axle 56 and spindle 28 having cabin 12 center rotation point 84 driven at drive point 88 through arc center line 82 producing tilt arc 90 having a predetermined maximum value.

Figure 4:
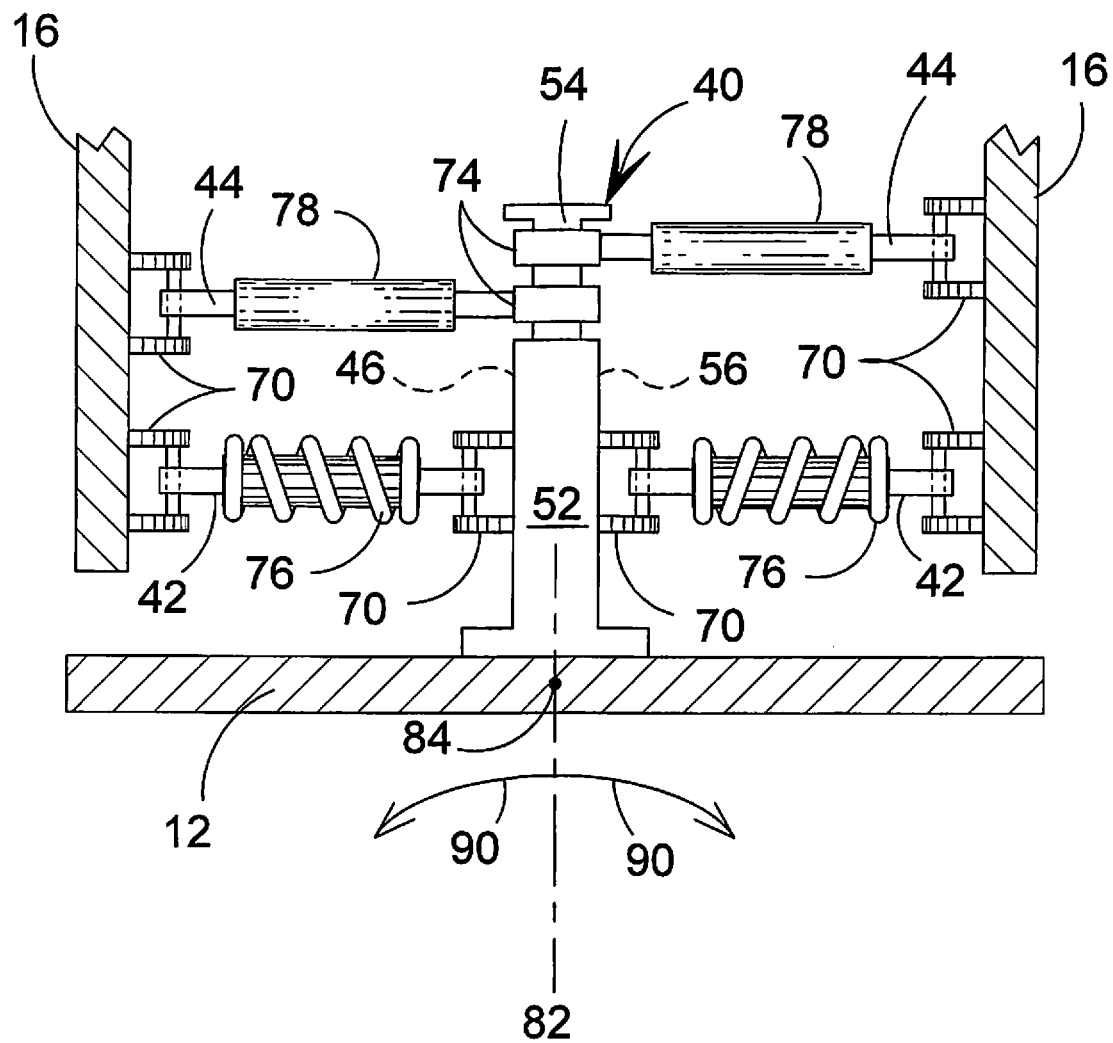
FIG. 4 is a top view of the pivot arm attached to the front chassis and rear chassis.

Referring to FIG. 4, shown is a top view of the pivot arm attached to the front chassis and rear chassis. The pivot arm 40 serves the dual purpose of tilting the front chassis/passenger cabin 12 when the steering wheel is turned and returning/keeping the compartment in its stationary operative state when not tilting. Pivotally anchored to the rear chassis 16, the pivot arm 40 has a pair of opposing side fasteners 70 along with opposing side rear chassis fasteners 72 for attachment of stationary force member 42, shown for enablement purposes as a respective coilover dampener 76 positioned between the pivot arm fastener 70 and rear chassis fastener 72 functioning to maintain the passenger cabin 12 in its operative stationary state. Also shown is a pair of dynamic force member 44, shown for enablement purposes as rams 78 fastened between a respective rear chassis fastener 72 and fastener arm 54 used in overcoming the stationary force member 42 coilover dampeners 76 driving the passenger cabin left or right by drive arm 52 tilting chassis 12 through arc 90 from center point 84 with the coilovers 76 returning the passenger cabin to its stationary operative state as the force on the rams 78 dissipates.

Figure 5:
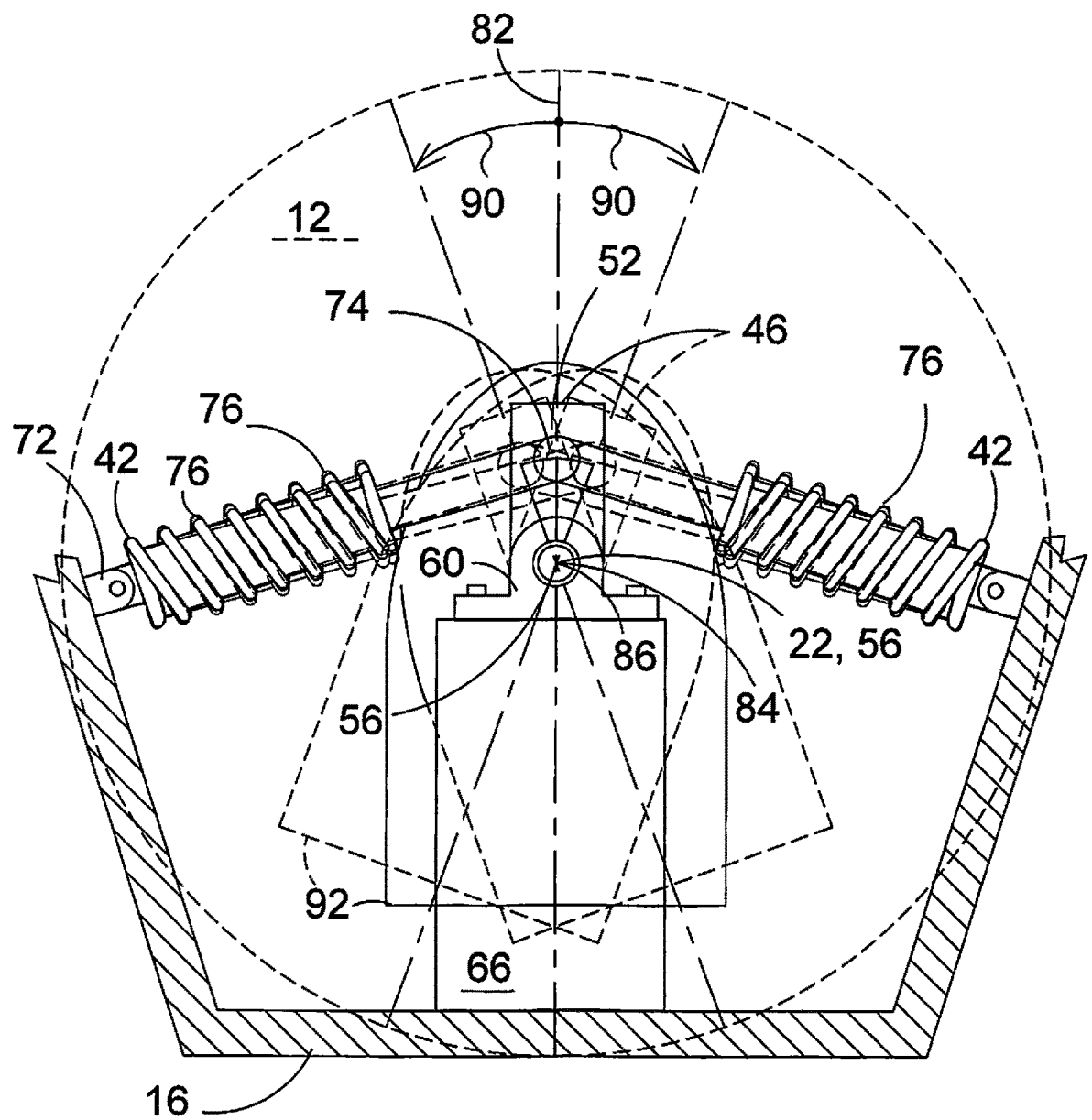
FIG. 5 is an illustrative view of the pivot arm coilover dampeners in use.

FIG. 5 is an illustrative view of the pivot arm spring over shock coilover in use. Coilover(s) 76 are a secondary mechanical safety mechanism maintaining the chassis/cabin 12 substantially horizontally coplanar with the rear chassis 16 while not tilting. Dynamic force member 44, shown enabled in FIG. 4 as ram 78, drives the pivot arm 46 in response to a control, in this enablement fluid pressure. In operation, force member 44 has an at rest state when cabin 12 is substantially horizontal and stationary force member 42 is in a similar at rest state until the force of force member 44 exceeds the at rest force of the coilover thereby extending and/or contracting coilover(s) 76 with continuous resistive pressure to return to an at rest position or a state of equilibrium in the stationary and dynamic force members 43, 44.

Referring to FIGS. 6A through 6C, illustrated are a dynamic force member moving the cabin from an at rest position through left and right turns. The number of force members 44 is a design decision, as illustrated the present invention provides for at least one force member 44 shown enabled as ram 78 anchored 72 to rear chassis 16 driving 122 cabin 12 via passenger cabin tilt drive arm 52 via ram fastener arm 54 of pivot arm 46 from an at rest state 82, shown in FIG. 6A through either right tilt arc 90, FIG. 6B or left tilt arc 90 FIG. 6C tilting cabin 12 seat 92 thereby providing the motorcycle-like tilt of the Trik's passenger cabin/front chassis 12. Whether mechanically or electrically, pivot arm 46 attached to axle 56, which is in linear alignment with hub axle 28 of hub 22, extends through passenger cabin tilt arm 52 fastened to cabin 12 creating a rear-chassis cabin-load bearing-member spaced away from the main chassis coupling 22 and a second dampening point from frame chatter. Further adding the front/rear chassis tilt guides, shown in FIG. 8A-8D will mitigate any feel of a split chassis.

Figure 7A:
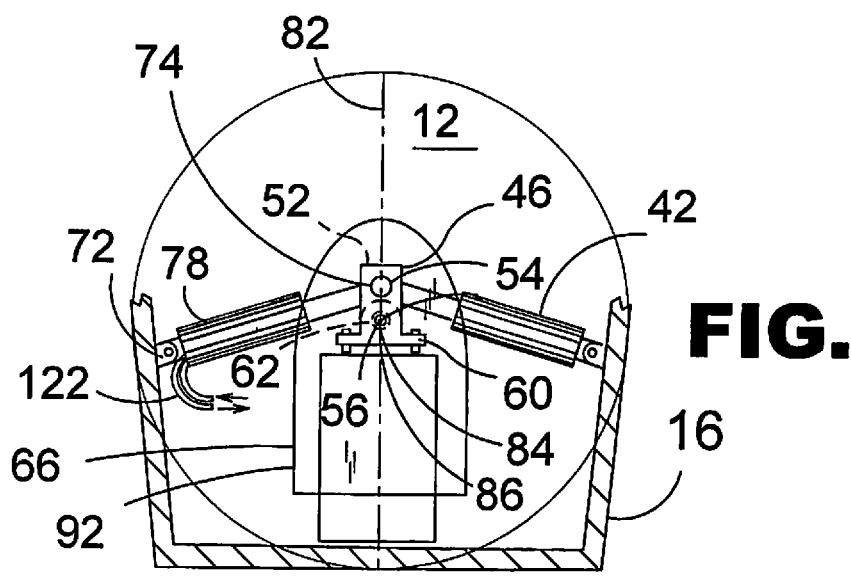
FIG. 7A is an illustrative view of a pair of force member used to tilt the cabin in an at rest state.
Figure 7B:
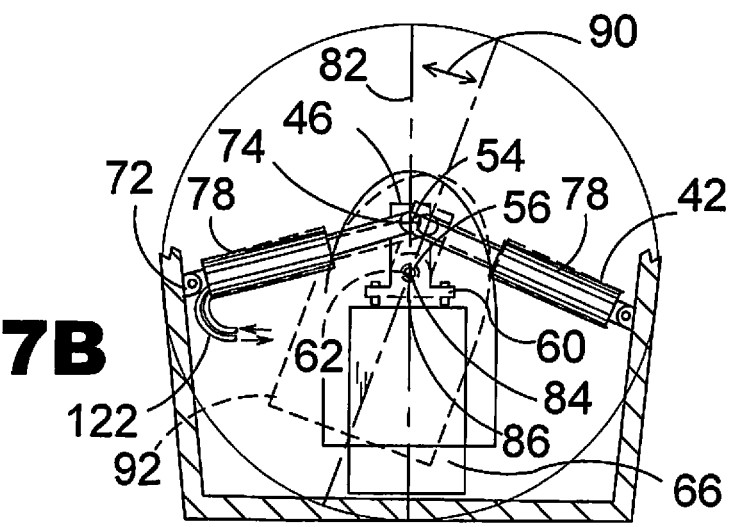
FIG. 7B is an illustrative view of a pair of force member tilting the cabin to the right.
Figure 7C:
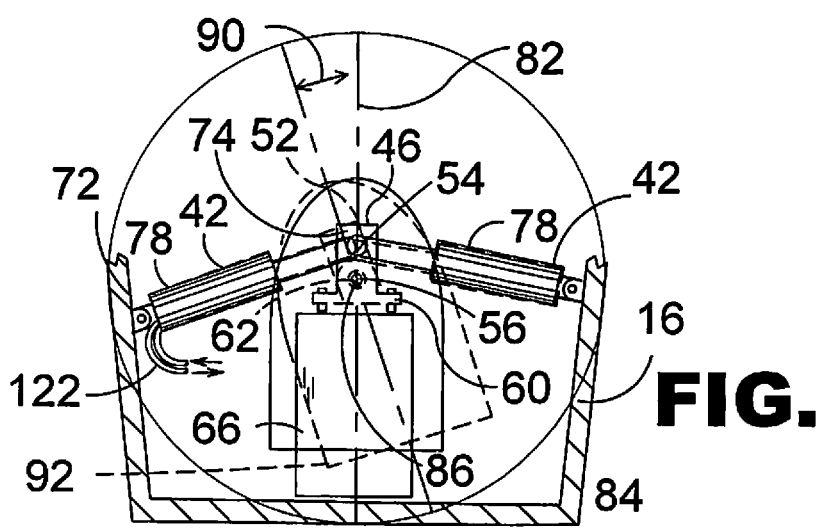
FIG. 7C is an illustrative view of a pair of force member tilting the cabin to the left.

Referring to FIGS. 7A through 7C, illustrated are a plurality of dynamic force member moving the cabin from an at rest position through left and right turns. As aforementioned, the number of force members is a design decision and as illustrated the present invention provides for a plurality of force member 44.

Referring to FIG. 8A-8D shown are views of the front/rear chassis tilt guides. FIG. 8A depicts rear chassis 16 having rollers 98 attached by support 100 with the rollers contained within tracks 102, as shown in FIG. 8B, with the rollers providing a third chassis contact dampening point. FIGS. 8C and 8D depict different track members. A single track member 102 is shown in FIG. 8D having one element of 102 attached to cabin 12 and the other track element 102 attached to the rear chassis.

Figure 9:
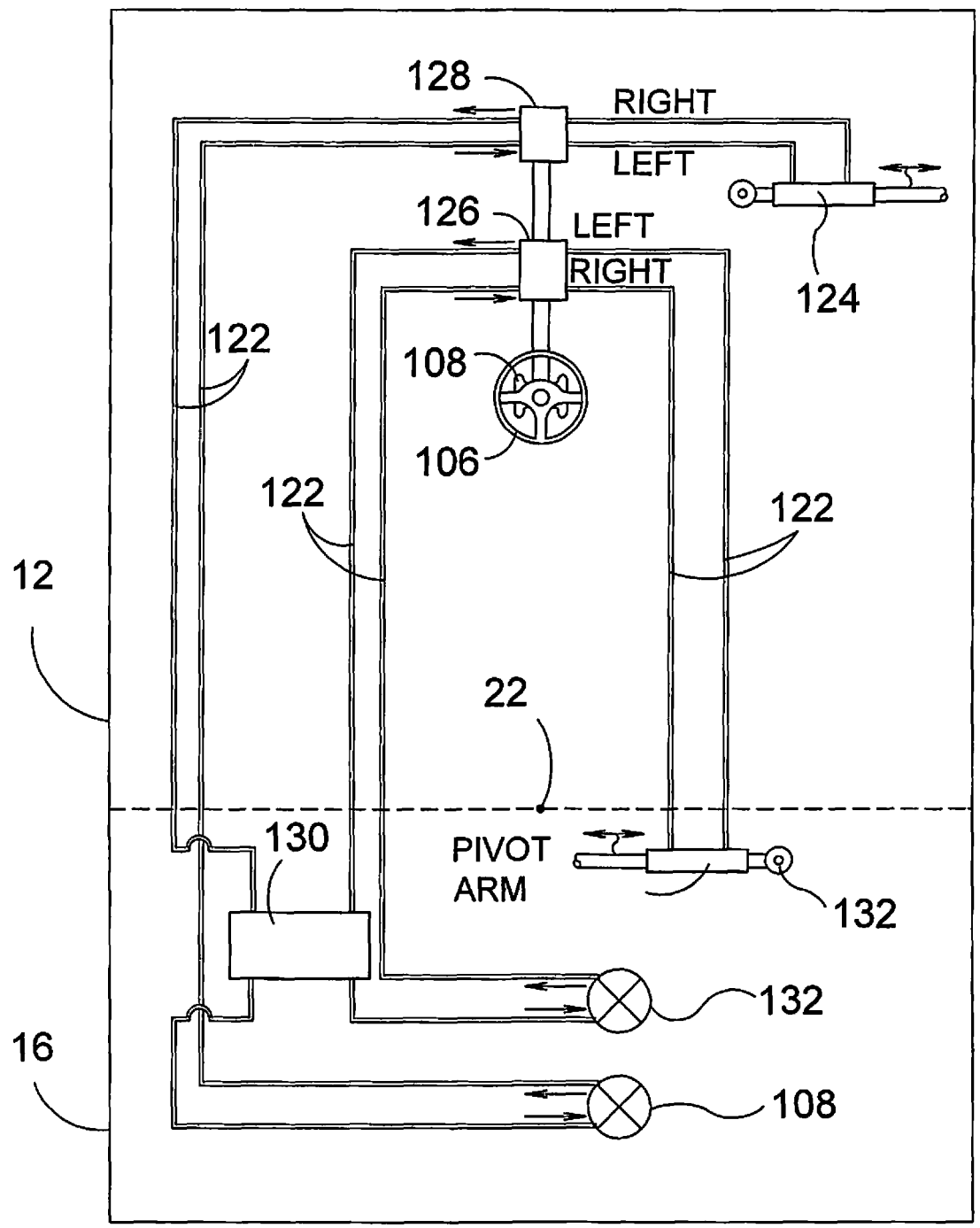
FIG. 9 is an illustrative view of the hydraulic system.

Referring to FIG. 9, shown is an enablement of the steering wheel controlled hydraulic pressure system of the present invention. Steering wheel 106 has steering column mounted vehicle control console 108 for shifting gears, braking and accelerating and servos 126 and 128 in fluid communication with pumps 108, 132 enabling extension/retraction of power steering ram 124 and ram 78.

Figure 10:
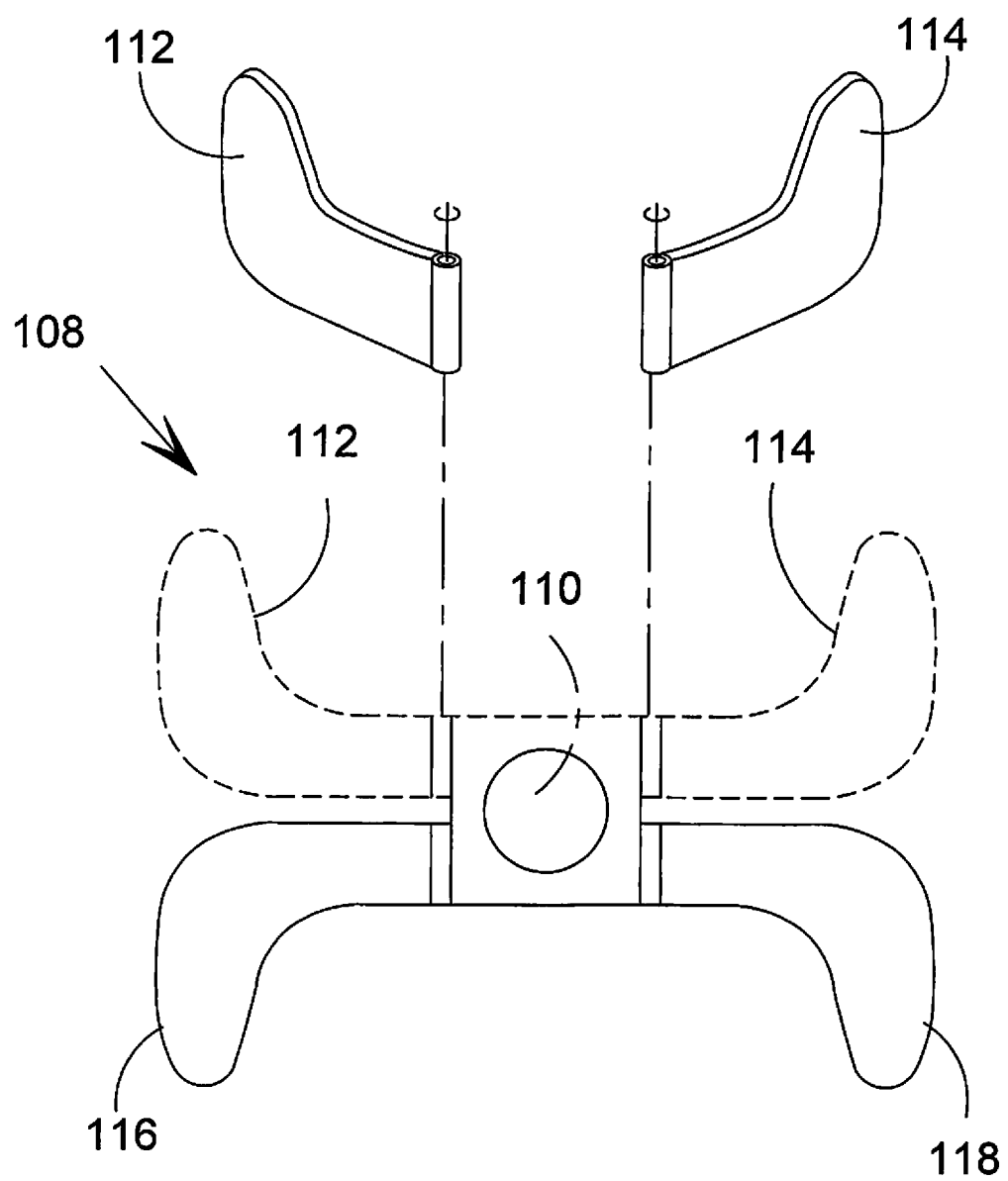
FIG. 10 is an illustrative view of a steering column mounted vehicle operational hand controls.

Referring to FIG. 10, shown is an embodiment of the present invention's steering column paddle shifters. The present invention envision alternately providing hand controls 108 for shifting gears, braking and accelerating in addition to or instead of the typical gear shifter, brake and accelerator foot controls (not shown). Also provided is either a stick shift or motorcycle-like rocker foot pedal when the trike uses a manual transmission. The paddle controls 108 comprise housing mounted 110 to the steering column with a plurality of switches in communication via linkage to cables for braking, accelerating and gear shifting. Enablement of these switches is illustrated as paddles 112, 114, 116 and 118 with the upper left 112 and right paddle 114 shifters used to select gears whether the vehicle has an automatic or semi-automatic transmission and the lower left 116 and right paddle 118 shifters are used to control the brake and accelerator.

The lower paddles shifters 116, 118 to the accelerator cable and the brake cable or pedal can be connected out of the sight of the driver. This can be achieved via a mechanical link or a power assisted link from the lower paddle shifters. So there will be no cabin visible connectors on the floor to gas and brake pedals. When the handicap mode is not active the gas and brake paddle shifters can be selectively disabled to avoid the driver accidentally accelerating or braking via the paddle shifters.

All Access hand controls are for elderly drivers and drivers with a disability. In regards to the elderly drivers, some have weakening legs as they get older and have problems pressing the brake and gas pedals with enough force. This is where the hand controls come into play. Likewise if a normal driver sprains their driving leg or breaks their driving leg, the trike allows them thru hand controls to drive themselves.

Figure 11:
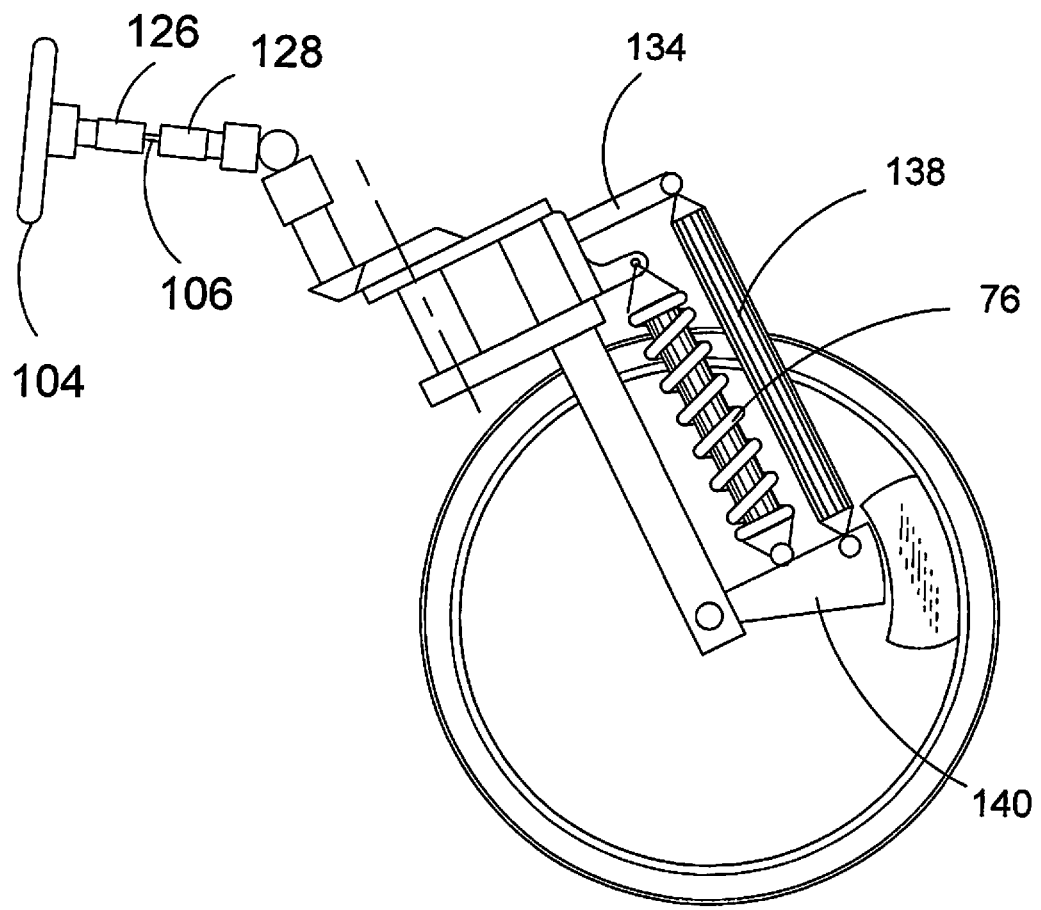
FIG. 11 is an illustrative view if the front wheel steering system.

Referring to FIG. 11, shown is steering assembly and custom fork designed to hold the tire connected to a springer front end suspension. Shown is steering wheel 104 and column mounted servos 126, 128 in linkage communication with a custom designed fork having springer front end suspension including torsion bar 134, ride bar 138, control arm 140 and coilover 76. Using a dual (or multiple) automobile coilover spring(s) 76 and dampener assembly to deal with the additional weight that is more than what a typical motorcycle suspension can handle. A motorcycle has a lot of load bearing on the single front tire during braking the additional, stronger car coilover assembly 76 (dampener and springs) will add to better handling on the trike. Also a car disc brake system will be used on the front tire. With a conventional car disc brake rotor and car brake caliper with single or multiple pistons to give better braking on this trike. This front car braking system is used versus a front bike braking system, since the front bike brakes will not be able to handle the load capacity of the trike along with payload.

Figure 12A:
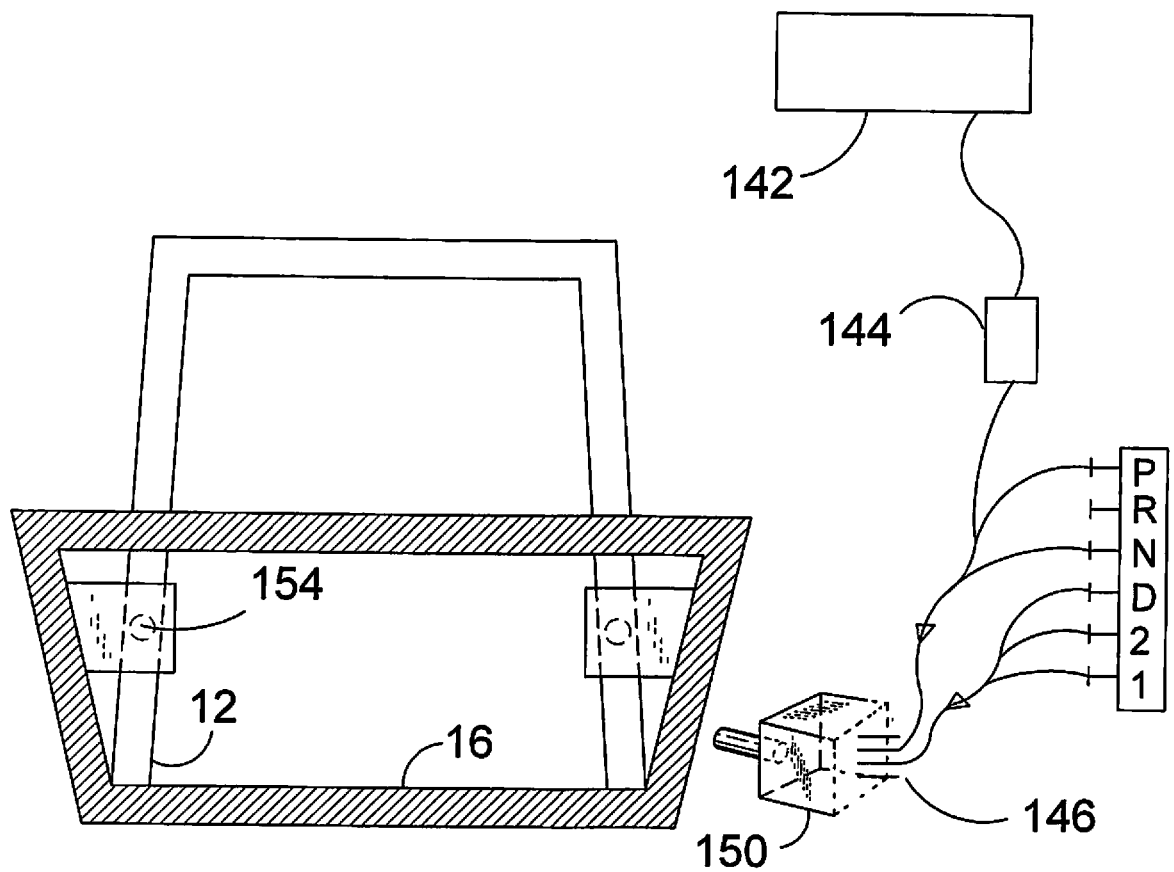
FIG. 12A is an illustrative view of the chassis tilting lock mechanism and transmission control.
Figure 12B:
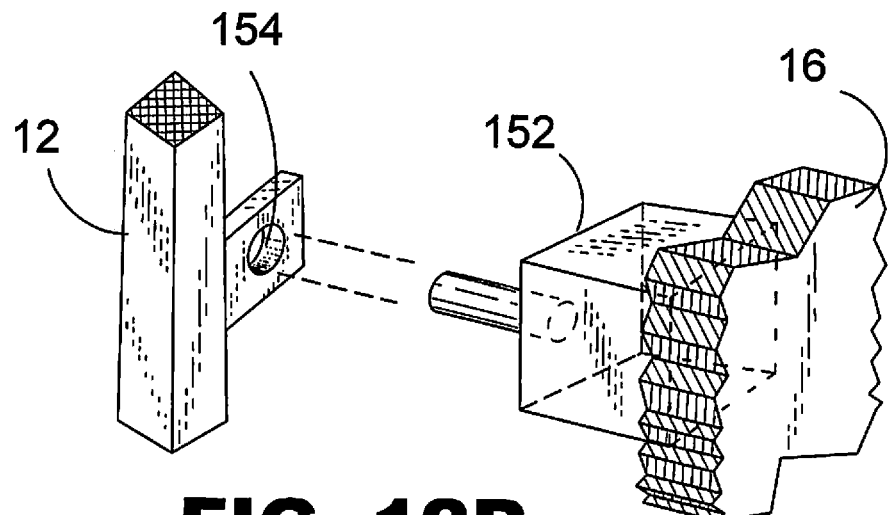
FIG. 12B is an illustrative view of the chassis non-tilting manual lock mechanism

Referring to 12A and 12B, shown are illustrative view of the chassis tilting lock mechanism and transmission control. FIG. 12A illustrates tilting cabin chassis 12 having one of a mating latching member, shown enabled as a cabin 12 attached structural member having an aperture 154, shown in FIG. 12B, for receiving a rod/pin from a mating latching member attached to a movable rear chassis 16 element. In a preferred operation, actuator 146 provides enablement of the cabin 12 tilting when the vehicle is in a forward gear. When stationary the latching is automatically engaged.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A three-wheeled vehicle comprising:
   a) a rear chassis portion having a frame incorporating a coupling member and wheels;
   b) a front chassis portion having a frame incorporating a coupling member and a steerable front wheel;
   c) the rear chassis portion and the front chassis portion when conjoined by the latchable front and rear coupling members enables the front chassis portion to tilt relative to the rear chassis portion by virtue of the conjoined couplings and the front wheel;
   d) the rear chassis portion and the front chassis portion comprising tracks and rollers releasably fixed to a respective front and rear chassis portion forming guideways for constraining tilt movement to a predetermined angular range.

2. The three wheeled vehicle of claim 1 further comprising a roll cage attached to the frame of the front chassis portion.

3. The three wheeled vehicle of claim 1, wherein angular tilting is preferably about a 45°±15° axis of a sun mounted unit of the drive spindle of the front chassis.

4. The three wheeled vehicle of claim 3, further comprising a center sun unit housing a spindle and a directional center assembly unit securing unit.

5. The three wheeled vehicle of claim 3, further comprising springs and dampeners holding the front chassis in an at rest steady state coplanar with the rear chassis with the springs and dampeners returning the front chassis to a rear chassis coplanar steady state after directional tilting.

6. The three-wheeled vehicle of claim 1 further consisting a force control height management system comprising a single, dual, or multiple shock unit(s), a control bar(s) and a torsion bar(s) thereby controlling ride height and road feel.

7. The three wheeled vehicle of claim 6, where the steerable wheel is in fluid communication with a plurality of rams driving a pivot arm in a controlled left or right tilt dependent on angular rotation of the steering wheel.

8. The three wheeled vehicle of claim 6, further comprising hydraulic steering column with servos and at least one hydraulic steering pump or hydraulic pump at the engine or in the engine bay area.

9. The three wheeled vehicle of claim 6, where the hydraulic tilt system is controlled by pressure supply by steering system turning.

10. The three wheeled vehicle of claim 6, further incorporating ECU, Actuators, Sensors, Pulse width units.

11. The three-wheeled vehicle of claim 1 wherein the pair of frames further provides mateable locking members that can be selectively actuated to disable the vehicle front chassis from tilting.

12. The three wheeled vehicle of claim 11 further providing a locked at rest state under predetermined vehicle conditions including, vehicle off, parked or low speed.

13. The three wheeled vehicle of claim 11 further providing another pair of locking members that are manually engage by applying a force to either chassis thereby actuating the additional pair of locking members.

* * * * *